United States Patent [19]

Wolfinger

[11] 4,444,064
[45] Apr. 24, 1984

[54] ELECTROMAGNETIC TORQUE MEASURING INSTRUMENTATION FOR A ROTATING SHAFT

[75] Inventor: John F. Wolfinger, Schenectady, N.Y.

[73] Assignee: General Electric Company, Schenectady, N.Y.

[21] Appl. No.: 388,282

[22] Filed: Jun. 14, 1982

[51] Int. Cl.³ .............................................. G01L 3/10
[52] U.S. Cl. ................................................. 73/862.34
[58] Field of Search ............................ 73/862.34, 660; 324/209

[56] References Cited

U.S. PATENT DOCUMENTS

| | | | |
|---|---|---|---|
| 2,993,161 | 7/1961 | Steele | 321/63 |
| 3,161,730 | 12/1964 | Collins | 179/100.2 |
| 3,308,435 | 3/1967 | Haner et al. | 340/168 |
| 3,640,131 | 2/1972 | Turk | 73/136 A |
| 3,646,455 | 2/1972 | Coccagna | 328/133 |
| 3,873,912 | 4/1975 | Mori et al. | 324/346 L |
| 3,885,420 | 5/1975 | Wolfinger | 73/70.1 |
| 3,934,459 | 1/1976 | Wolfiner et al. | 73/70.1 |
| 3,935,733 | 2/1976 | Schindler | 73/862.34 |
| 4,020,685 | 5/1977 | VanMillingen et al. | 73/136 A |
| 4,121,272 | 10/1978 | Wolfinger | 361/236 |
| 4,186,597 | 2/1980 | Brown | 73/136 A |

FOREIGN PATENT DOCUMENTS 2209306 9/1973 Fed. Rep. of Germany ... 73/862.34
968503 9/1964 United Kingdom ............. 73/862.34

*Primary Examiner*—Jerry W. Myracle
*Attorney, Agent, or Firm*—Robert C. Kain, Jr.; John F. Ahern

[57] ABSTRACT

A method and apparatus for continuously monitoring torque in a rotating shaft. The invention includes a pair of electromagnetic probes in fixed proximity to the shaft and spaced-apart in the direction of the shaft's longitudinal axis. The probes are operable in two modes. In the first, each probe is excited to cause a fixed magnetic pattern to be induced onto the surface of the shaft along a circumferential line adjacent to the probe. In the second mode, movement of the magnetic pattern due to the shaft rotation induces a signal into each probe. Each signal is indicative of the instantaneous angular velocity of the shaft at the corresponding shaft location. The two induced signals are conveyed to phase detection circuitry which produces a signal indicative of the phase relationship between the two input signals. The electrical phase relationship is a direct measure of the twist in the shaft, proportional to torque.

15 Claims, 4 Drawing Figures

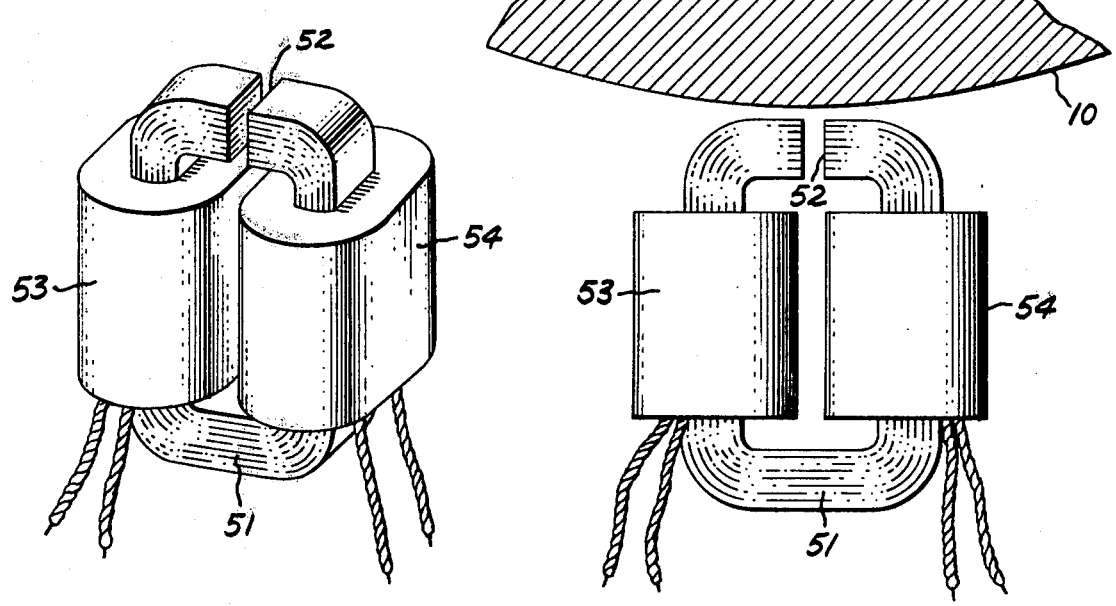

ELECTROMAGNETIC TORQUE MEASURING INSTRUMENTATION FOR A ROTATING SHAFT

CROSS-REFERENCE TO RELATED APPLICATION

A related application, U.S. patent application Ser. No. 016,837, "Method And Apparatus To Generate Angular Velocity Signals By Magnetic Recording And Playback", filed on Mar. 2, 1979, of common assignee and inventorship with the present invention, is hereby incorporated herein by reference.

BACKGROUND OF THE INVENTION

The present invention relates to apparatus for measuring torque on a rotating shaft and provides instrumentation and a method for carrying out such measurements without physically contacting the shaft and without attaching toothed gears, wheels, and other such apparatus or indicia to the shaft.

For many kinds of rotary machines, such as, for example, the large turbine-generators used for commercial power generation, it is desirable, and indeed frequently necessary, to monitor the torque developed between separate locations on the central rotating shaft. The torque generated on the rotating shaft is often oscillatory in nature, raising and falling as a result of the complex interaction of the various masses being driven by the shaft, and, in the case of a turbine-generator, also as a result of the interaction of the electrical power output with the connected electrical load. Torque between axially separated points on a shaft produces a degree of twist in the shaft whose magnitude depends on the torque and on the metallurgy and geometry of the shaft.

Continuous torque monitoring not only provides a permanent record for analysis to correlate shaft torque with various operating conditions of the machine, but it also provides an immediate indication that corrective action is required should the torque become excessive. Excessive torque is to be guarded against, of course, to prevent permanent damage to the shaft and to other portions of the machine in those extreme situations wherein excessive torque may cause the shaft to be broken.

A number of instrument systems have been developed over the years for continuously monitoring torque on a rotating shaft. Generally, these systems have required that some device be added to the shaft in order to detect shaft rotational speed as a fundamental measurement. Toothed gears for example are commonly placed on the shaft so that the passage of gear teeth past a fixed point provides an indication of shaft angular velocity. Light reflective strips applied to the rotating shaft are also known to be used to detect shaft speed. From the basic speed indication, in combination with other measurements or assumptions, a measure of torque is then obtainable as a derived quantity.

A direct measurement of torque can be gained by using two separate sets of such rotating indicia. For example, in U.S. Pat. No. 4,186,597 a digital torque meter is disclosed in which a pair of spaced-apart gears on the shaft provide signals whose phasing is compared as an indication of twist and torque on the shaft. In U.S. Pat. No. 3,934,459 to Wolfinger et al, shaft angular velocity from a shaft mounted toothed wheel provides the fundamental measurement and torque in various shaft sections is then derived by application of a mathematical modeling technique.

Although these prior art systems and techniques have generally performed their intended functions satisfactorily, their utility has been limited by the necessity of making some attachment to the rotating shaft. In many cases it is simply not practical to add a toothed wheel to a rotating shaft. Further, light reflecting strips and other such indicia become obscure with time and often are hidden by oil mists, deposited films, and so forth. The present invention is therefore directed toward apparatus and a method for measuring torque in a rotating shaft, which method and apparatus alleviates the aforementioned and other prior art problems.

SUMMARY OF THE INVENTION

Torque monitoring instrumentation according to one aspect of the invention includes a pair of electromagnetic probes in fixed proximity to the rotating shaft to be monitored and spaced apart in the direction of the shaft's longitudinal axis. The probes ae operable in two modes. In the first mode, each probe is excited to cause a fixed magnetic pattern to be induced onto the surface of the shaft along a circumferential line adjacent the probe. In the second mode, movement of the magnetic pattern due to rotation of the shaft causes a signal to be induced into each probe. This signal is indicative of the instantaneous angular velocity of the shaft at each location. The two output signals are conveyed simultaneously to phase detection means which produces a signal indicative of the phase relationship between the two input signals. The electrical phase relationship is a direct measure of the twist in the shaft, which is proportional to torque, the desired quantity. Switching means is included for selecting either of the two modes of operation; however, following induction of the magnetic pattern in the first mode it is seldom necessary (for the same shaft and location thereon) to revert to the first mode since the magnetic pattern is substantially permanent. It will be recognized, of course, that the shaft must possess some degree of magnetic permeability. This is the general case with metal shafts commonly used.

In a preferred form of apparatus, means are included to synchronize the frequency of the excitation signal used in the first mode of operation to the shaft speed. This ensures that the induced magnetic pattern is substantially independent of the shaft speed when the pattern is being induced. Further, the two probes are electrically combined with capacitors in the first mode of operation to form series resonant circuits, and with other capacitors in the second mode of operation to form parallel resonant circuits. These resonant circuits are tuned to the excitation frequency generated at the normal operating shaft speed. For example, for a turbine-generator commercially used in the United States, the excitation frequency at normal shaft speed is preferably some multiple of 60 Hz. The series and parallel resonance conditions enhance the operating mode with which they are associated.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIG. 3 illustrates one form of an electromagnetic probe suitable for use with the embodiment of FIG. 1; and FIG. 4 is a side elevational view of the electromagnetic probe of FIG. 3 as it may be positioned adjacent a rotating shaft.

DETAILED DESCRIPTION OF THE INVENTION

Figure 1:
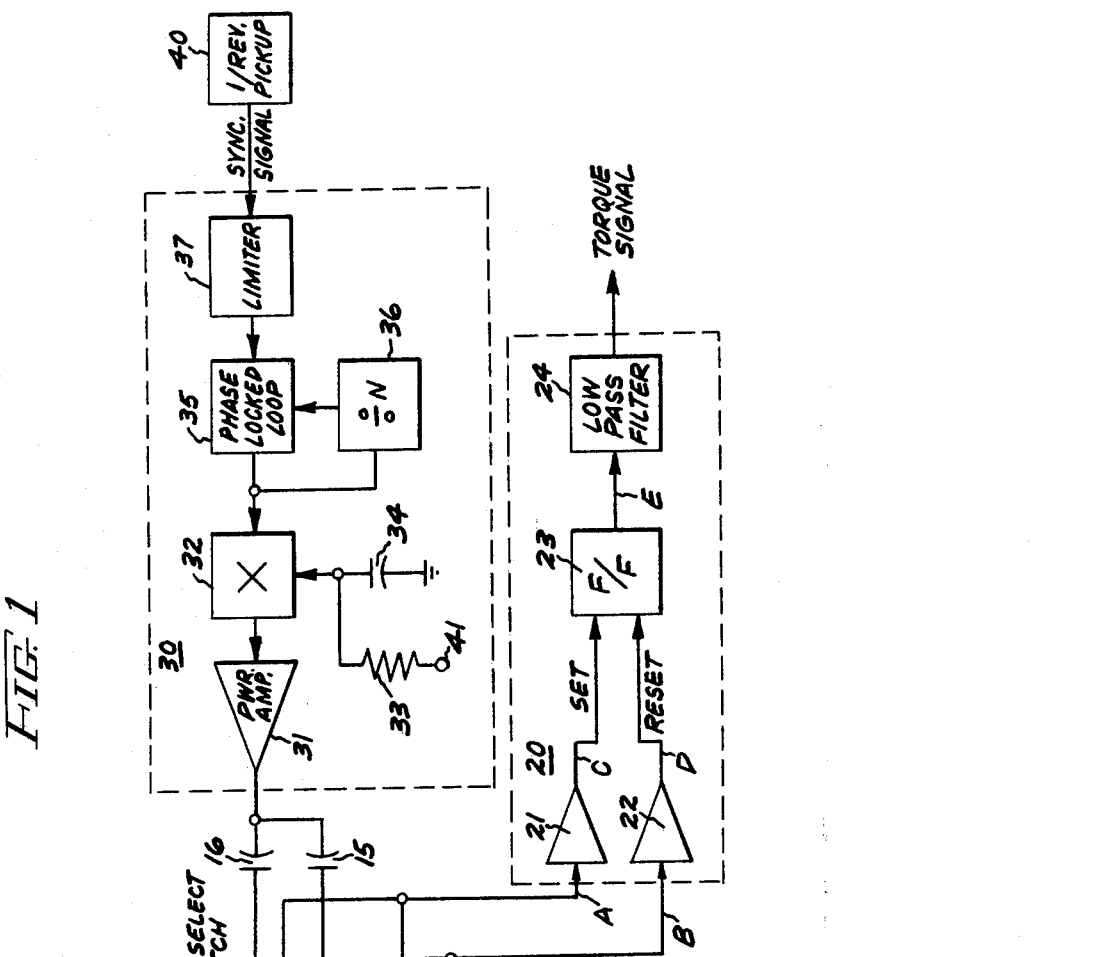
FIG. 1 is a schematic illustration of a preferred embodiment of the invention for continuously monitoring torque on a rotating shaft.

With reference to FIG. 1, electromagnetic probes 10 and 11 (more fully described herein below) are positioned closely adjacent the surface of rotating shaft 12 but are spaced apart from each other in the axial direction of the shaft 12. The axial separation may be chosen as convenient, but sensitivity of the measurement is increased with increased axial separation.

Each electromagnetic probe 10, 11 of FIG. 1 is connected to a section of mode selector switch 14 by which the mode of operation of probes 10 and 11 is selected. In the first mode, with selector switch 14 in the up or first position as illustrated, an excitation signal is simultaneously applied to both probes 10 and 11 through series resonating capacitors 15 and 16. Generation of the excitation signal will be more fully described below, but initially it will be sufficient to note that capacitors 15 and 16 form series resonant circuits with the inductance of each electromagnetic probe 10 and 11. Each such resonant circuit is tuned for resonance at the excitation frequency. The result of this condition is that the current in each probe is limited only by the effective series resistance of each probe, i.e., current developed in each probe is maximized.

With a maximized effect due to the resonance, each probe induces onto the surface of the rotating shaft 12 a magnetic pattern which varies in intensity along a circumferential line around the shaft 12. The magnetic pattern produced is substantially sinusoidal as a result of the resonance condition and each pattern is of the same frequency. For illustration purposes, each magnetic pattern is illustrated in a simplified form on the shaft 12 of FIG. 1. It is to be recognized, however, that the pattern is sinusoidal in intensity from point to point along the circumferential line and not with axial swings about the line as illustrated. Once the magnetic pattern is established it remains substantially permanent and the electromagnetic probes 10 and 11 may be switched to the second mode of operation by moving mode select switch 14 to its alternate, second position.

With mode select switch 14 in the second mode position, capacitors 17 and 18 are switched in parallel, respectively, with electromagnetic probes 10 and 11. In this configuration, the inductance of each probe 10, 11 forms a parallel resonant circuit with corresponding capacitors 17 and 18, each resonant circuit being resonant at the same frequency as the series resonant circuits described above for use in producing the shaft magnetic pattern. As each magnetic pattern moves past the corresponding electromagnetic probe 10 and 11 as a result of the shaft rotation, a voltage signal is induced into the probes by the moving magnetic field. The frequency of the induced signal is proportional to the frequency of the magnetic pattern on the shaft 12 and to the speed of rotation. For very small deviations in speed, changes in the induced signal are manifested simply as phase shifts.

As torque is applied to the shaft 12, a small but finite twist occurs therein which produces in the induced output signal a shift in phase of one signal from the other. The degree of phase shift is directly related to the twist between points on the shaft and, therefore, to the shaft torque.

Figure 2:
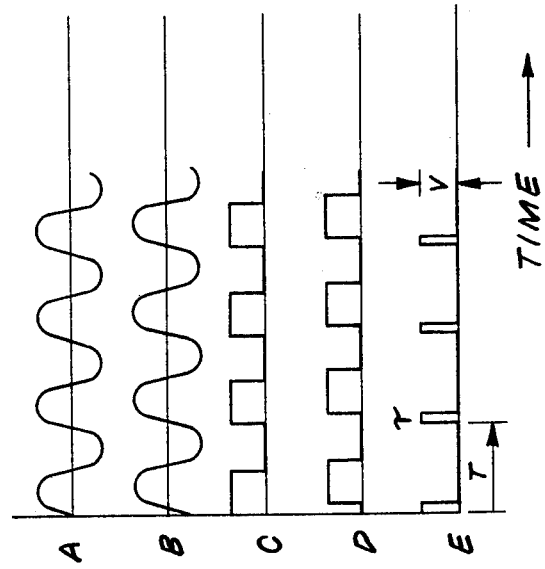
FIG. 2 illustrates wave forms, and their relationship in time, for various circuit points of the embodiment of FIG. 1.

The output signals from the electromagnetic probes 10, 11 (i.e., from the parallel resonant circuits comprising probes 10 and 11 and capacitor 17 and 18, respectively) are applied to a phase detection network 20 including pulse shaping circuits 21 and 22; reset/set (RS) flip-flop 23; and a low pass filter 24. The two input sine wave signals, appearing at circuit points A and B, are of the same frequency but differ slightly in phase depending on the shaft torque. Pulse shaping circuits 21 and 22 may be comparator devices of conventional design, and, as used herein, function to buffer the resonant circuits and to produce pulse signals from the input sine waves. Preferably, the output of each shaping circuit 21 and 22, at circuit points C and D, is a square wave corresponding to one half of the sine wave input. Each square wave is preferably turned on and off at the zero crossing of the corresponding sine wave. This is carried out in a conventional manner well known to those of ordinary skill in the art. The output pulse from shaping circuit 21 is applied to the SET input of the RS flip-flop 23 causing its output to be set to a high level; the output pulse from shaping circuit 22 is applied to the RESET input of RS flip-flop 23 resetting the flip-flop output to a low level. Thus, flip-flop 23 may be regarded as being turned on by one pulse and turned off by the other. The duration of the on time is thus proportional to the phase difference between the input signals which, in turn, is indicative of the twist and torque on shaft 12. FIG. 2 illustrates the relationship between the various wave forms appearing at correspondingly marked circuit points. The pulses appearing at point E are thus of substantially constant amplitude but of variable time duration. These pulses are applied to a low pass filter 24, the output of which is a time varying dc voltage whose amplitude is given by $$V_{OUT} = T/\tau V$$

where $\tau$ is the time duration of a given pulse from the flip flp 23, V is the pulse amplitude, and T is the time for one complete cycle. $V_{OUT}$ is therefore indicative of the torque on shaft 12.

The excitation signal, utilized in the first mode of operation as discussed above, is generated in an excitation network 30 which includes a power amplifier 31; an analog multiplier 32, having an integration network comprising resistor 33 and capacitor 34; a phase locked loop 35; a frequency divider 36; and a limiter 37. The excitation source 30 provides a signal, appearing at the output of power amplifier 31, which has a frequency that is a multiple of shaft rotational speed. This ensures that the magnetic patterns around shaft 12 are coincidently induced on each turn of the shaft. The synchronization signal is a recurring pulse developed by the pickup 40. Although the exact frequency of the synchronization signal is not critical, it is necessary that the frequency be related to shaft speed. A pulse recurring at the rate of once per revolution is most convenient, and in those situations wherein torque is being monitored on the shaft of a utility turbine-generator set, a one/rev synchronization signal may readily be obtained from the generated electrical power output.

The sync signal is applied to limiter 37 which limits the amplitude so that a signal is obtained having substantially a constant amplitude. The phase locked loop 35 and frequency divider 36 function together to multiply the frequency of the synchronization signal so that the signal applied to analog multiplier 32 is N times the frequency of the sync signal where N is the divisor of frequency divider 36. Frequency synthesis in this manner is conventional and is more fully detailed in the patent application Ser. No. 016,837, referenced above.

In order to bring the excitation signal up to full peak-to-peak amplitude relatively slowly at the time the magnetic pattern is initially to be induced onto the surface of the shaft 12, the synthesized signal from phase locked loop 35 is multiplied by relatively slowly increasing signal applied at the second input of the multiplier 32. This slowly increasing signal is obtained from the integrator network of capacitor 33 and resistor 34. Thus, when the magnetic pattern is to be formed, a momentary dc voltage is applied to terminal 41 of the excitation network. The resulting voltage across capacitor 34 builds up at a rate determined by the time constant of capacitor 34 and resistor 33. The time constant is chosen to be relatively long, e.g., a matter of a few seconds. Since the output of the multiplier 33 is the product of this slowly increasing voltage and the synthesized frequency signal from phase locked loop 35, the excitation signal is slowly increased to its final peak-to-peak amplitude. This is advantageous in that ringing and other oscillatory effects are avoided in electromagnetic probes 10 and 11. Finally, the excitation signal is applied through power amplifier 31 to series resonating capacitors 15 and 16 and, if switch 14 is set for operation in the first mode, to electromagnetic probes 10 and 11.

The frequency of the excitation signal determines the number of cycles in the magnetic pattern induced onto the surface of the rotating shaft 12. The higher the frequency of the excitation signal, the more cycles per shaft revolution there are in the sine wave induced pattern. These factors are determinative of the sensitivity with which twist and torque can be detected in the shaft 12. For example, phase shift between the electrical signals at circuit points A and B may be detected from 0 to 360 electrical degrees. Thus, 360 degrees of electrical phase shift may be considered full scale. If the magnetic pattern on the shaft 12 contains a large number of cycles, induced by high frequency excitation signal, the 360 degree electrical shift relates to a relatively small amount of twist in the shaft 12. On the other hand, if the excitation frequency is relatively low, causing a lesser number of cycles to be produced in the magnetic pattern, 360 degrees of electrical phase shift is related to a greater degree of twist in shaft 12. An excitation frequency of 3600 Hz or higher at normal operating shaft speed, for example, is suitable for monitoring shaft torque in a large turbine-generator.

FIGS. 3 and 4 illustrate in detail an electromagnetic probe suitable for use with the present invention. For example, the probe of FIGS. 3 and 4 includes a laminated iron core 51 having a narrow transverse slot 52 through one end and a pair of coils 53 and 54 wound about opposite arms of core 51. The slot 52 is preferably long enough to encompass axial movement of the monitored shaft which may occur, for example, due to thermal expansion. Coils 53 and 54 may be wound from AWG No. 26 wire and be approximately 550 turns each. The two coils 53 and 54 are preferably connected in parallel during the first mode of operation when the magnetic pattern is being induced on the shaft, and in series during the second mode when torque is being sensed. The desired configuration, series or parallel, may be made switch selectable. In FIG. 1, probes 10 and 11 are shown in simplified form to include only a single coil for the purpose of explaining the preferred circuit arrangement and operation of the invention. In operation, magnetic flux from within the core 51 traverses slot 52 with the result that a portion of the flux diverges out of the gap and passes into the shaft 12 to induce the magnetic pattern.

Operation

At this point it will be helpful to briefly review operation of the instrumentation of FIG. 1.

To continuously monitor the torque in rotating shaft 12, the first mode of operation is selected by mode select switch 14. Excitation source 30 provides an excitation signal whose frequency is synchronized to the speed of shaft 12 through pickup 40. At the normal shaft speed, the excitation signal frequency is equal to the resonance frequency of the series resonant circuits formed by probes 10 and 11 and capacitors 15 and 16. For a turbine-generator, for example, the normal speed will be that speed at which the generator is synchronized to the power distribution system. The excitation signal is slowly brought to full amplitude by momentarily applying a dc voltage at terminal 41, i.e., for a matter of seconds. Thus, in the first mode, fixed circumferential magnetic patterns are induced onto the surface of shaft 12.

In the second mode of operation, movement of the magnetic patterns with shaft rotation induces signals indicative of the shaft's instantaneous angular velocity into probes 10 and 11. The signals, developed in parallel resonant circuits formed with capacitor 17 and 18 are applied to phase detection network 20 which provides an output signal indicative of the phase relationship between the input signals. With the phase difference being proportional to twist in shaft 12 between the two probe locations, the output signal is a measure of shaft torque.

While there has been shown and described what is considered a preferred embodiment of the invention, it is understood that various other modifications may be made therein. It is intended to claim all such modifications which fall within the true spirit and scope of the present invention.

The invention claimed is:

1. Torque monitoring instrumentation for continuously measuring torque between first and second axially separate locations on a rotating shaft, comprising:
   first and second electromagnetic probes fixed with respect to said shaft and located in proximity to the surface thereof at said first and second locations, respectively, said first and second probes being operable in a first mode to induce a fixed circumferential magnetic pattern on to the surface of said shaft at said first and second locations, respectively, and being operable in a second mode to produce first and second output signals, respectively, in response to the movement of said magnetic patterns as said shaft is rotating, said first and second output signals each having a frequency indicative of the instantaneous angular velocity of said shaft at said first and second locations, respectively;

switching means operable to switch said first and second probes between said first and second modes;

excitation means for generating an excitation signal and for supplying said signal to said first and second probes in said first mode to cause said probes to induce said fixed circumferential magnetic patterns, said excitation means including means for synchronizing the frequency of said excitation signal with shaft speed so that said fixed circumferential magnetic pattern is invariant with shaft speed in said first mode; and phase detection means operable in combination with said first and second probes in said second mode to receive said first and second output signals and to produce a phase signal indicative of the phase relationship between said first and second output signals, said phase relationship being indicative of the torque on said shaft between said first and second locations.

2. The invention of claim 1 further including:

first capacitor means connected to said first and second probes in said first mode to form first and second series resonant circuits; and second capacitor means connected to said first and second probes in said second mode to form first and second parallel resonant circuits.

3. The instrumentation of claim 2 wherein said excitation means includes means for slowly increasing the peak-to-peak amplitude of said excitation signal.

4. The instrumentation of claim 3 wherein said excitation means includes a phase locked loop and a freqency divider for generating said excitation signal, and said means for synchronizing said excitation signal includes a shaft speed sensor providing a synchronizing signal to said phase locked loop.

5. The instrumentation of claim 4 wherein said phase detection means comprises:

pulse shaping circuitry responsive to said first and second output signals to produce first and second pulse signals; and a flip-flop responsive to said first and second pulse signals to produce said phase signal as a function of time duration of pulses produced by said flip-flop.

6. The instrumentation of claim 5 wherein said phase detection means further includes a low pass filter connected to receive said pulses from said flip-flop.

7. The instrumentation of claim 6 wherein said means for slowly increasing the peak-to-peak amplitude of said excitation signal comprises an analog multiplier providing the excitation signal as the product of a slowly increasing voltage and a signal output from said phase locked loop.

8. The instrumentation of claim 7 wherein said excitation means includes a power amplifier for amplifying said excitation signal.

9. For use in continuously measuring the torque between axially separate locations on the central rotating shaft of a turbine-generator set, apparatus comprising:

a first electromagnetic probe in fixed proximity to the surface of said shaft at a first one of said axial locations and a second electromagnetic probe in fixed proximity to the surface of said shaft at a second one of said axial locations, said first and second probes each being adapted for operation in a first mode to induce a fixed circumferential magnetic pattern onto the surface of said shaft at their respective locations and for operation in a second mode to produce corresponding first and second output signals in response to the motion of said magnetic pattern during shaft rotation;

excitation means supplying an excitation signal to said first and second probes during said first mode to cause said probes to induce said magnetic patterns, said excitation signal having a frequency which is proportional to the rotational speed of said shaft;

first capacitor means disposed in said first mode to form first and second series resonant circuits with said first and second electromagnetic probes, respectively, each series resonant circuit being resonant at the frequency of said excitation signal;

second capacitor means disposed in said second mode to form first and second parallel resonant circuits with said first and second electromagnetic probes, respectively, each parallel resonant circuit being resonant at the frequency of said excitation signal;

phase detection means adapted to receive said first and second output signals and to provide a phase indicative signal proportional to the phase separation between said first and second output signals, said phase indicative signal being characteristic of the torque between said first and second locations; and means for selectively switching between said first and second modes.

10. The apparatus of claim 9 wherein said excitation means includes a phase locked loop and a frequency divider for generating said excitation signal in response to a signal provided by a shaft speed sensor.

11. The apparatus of claim 10 wherein said excitation means further includes means for slowly increasing the peak-to-peak amplitude of said excitation signal.

12. The apparatus of claims 9, 10, or 11 wherein said phase detection means comprises pulse shaping circuitry for producing pulses indicative of the phase relationship between said first and second output signals, and a flip-flop for producing said phase indicative signal in response to the phase separation between such pulses.

13. The apparatus of claim 12 wherein said means for selectively switching between said first and second modes is a manually operated switch.

14. A method for measuring the torque between axially separate locations on a rotating shaft, comprising the steps of:

(a) inducing a first fixed circumferential magnetic pattern onto the surface of the shaft during shaft rotation at a first location thereon independent of shaft speed;

(b) inducing a second fixed circumferential magnetic pattern onto the surface of the shaft during shaft rotation at a second location thereon independent of shaft speed, said second location being axially spaced apart from said first location;

(c) generating a first signal in a first sensing probe responsive to the movement of said first magnetic pattern as the shaft is rotating, said first signal having a frequency indicative of the instantaneous angular velocity of said shaft at said first location;

(d) generating a second signal in a second sensing probe responsive to the movement of said second magnetic pattern as the shaft is rotating, said second signal having a frequency indicative of the instantaneous angular velocity of said shaft at said second location, (e) determining the phase separation between said first signal and said second signal, said separation being proportional to the torque on said shaft.

15. The method of claim 14 wherein steps (c),(d), and (e) are continuously repeated to provide a continuous indication of torque on the shaft.

* * * * *